United States Patent
Ver Hoven et al.

(10) Patent No.: US 10,512,310 B2
(45) Date of Patent: Dec. 24, 2019

(54) NOISE DAMPENING TONGUES FOR USE IN A SEAT BELT RESTRAINING SYSTEM AND METHODS OF MAKING THE SAME

(71) Applicant: AUTOLIV ASP, INC., Ogden, UT (US)

(72) Inventors: Robert E. Ver Hoven, Hansens Island, MI (US); David B. Figlioli, Clinton Township, MI (US); David Funnell, Windsor (CA)

(73) Assignee: AUTOLIV ASP, INC., Ogden, UT (US)

( * ) Notice: Subject to any disclaimer, the term of this patent is extended or adjusted under 35 U.S.C. 154(b) by 0 days.

(21) Appl. No.: 15/888,244

(22) Filed: Feb. 5, 2018

(65) Prior Publication Data

US 2019/0239598 A1    Aug. 8, 2019

(51) Int. Cl.
| | |
|---|---|
| A44B 11/25 | (2006.01) |
| B21D 22/02 | (2006.01) |
| B21D 28/26 | (2006.01) |
| B29C 43/18 | (2006.01) |
| B29C 45/14 | (2006.01) |

(Continued)

(52) U.S. Cl.
CPC .......... *A44B 11/2561* (2013.01); *B21D 22/02* (2013.01); *B21D 28/26* (2013.01); *B29C 43/18* (2013.01); *B29C 45/14336* (2013.01); *B29K 2705/00* (2013.01); *B29L 2031/727* (2013.01);

(Continued)

(58) Field of Classification Search
CPC .............. A44B 11/2561; B60R 21/055; Y10T 24/4047; Y10T 24/45241; Y10T 24/4736
See application file for complete search history.

(56) References Cited

U.S. PATENT DOCUMENTS

| 4,901,407 A | 2/1990 | Pandola et al. |
| 5,100,176 A | 3/1992 | Ball et al. |

(Continued)

FOREIGN PATENT DOCUMENTS

| CN | 104939442 A | 9/2015 |
| CN | 205611937 U | 10/2016 |

(Continued)

OTHER PUBLICATIONS

Machine Translation of JP 2009113532 generated at https://www4.j-platpat.inpit.go.jp (Year: 2019).*

*Primary Examiner* — Robert Sandy
*Assistant Examiner* — Michael S Lee
(74) *Attorney, Agent, or Firm* — Brinks Gilson & Lione (57) ABSTRACT

A noise dampening tongue assembly for use as part of a seat belt restraining system includes a base plate, a cover material, and a soft touch material. The base plate has a surface with a lower portion for engagement with a clamping member and an upper portion with a slot through which a belt webbing extends. The lower portion defines a bottom perimeter for the tongue assembly. The cover material contacts the base plate, such that it defines at least a portion of a top perimeter, a front-side, and a back-side of the tongue assembly. The soft touch material contacts the surface of the cover material, such that the soft touch material defines at least a portion of a right perimeter and left perimeter of the tongue assembly and extends horizontally across the surface of the cover material to connect the soft touch material located at right and left perimeters.

21 Claims, 8 Drawing Sheets

(51) Int. Cl.
 *B29L 31/00* (2006.01)
 *B29K 705/00* (2006.01)

(52) U.S. Cl.
 CPC ...... *Y10T 24/45241* (2015.01); *Y10T 24/4736* (2015.01)

(56) References Cited

U.S. PATENT DOCUMENTS

| | | | |
|---|---|---|---|
| 5,548,874 A | 8/1996 | Mishina et al. | |
| 5,806,148 A | 9/1998 | McFalls et al. | |
| 6,837,519 B2 | 1/2005 | Moskalik et al. | |
| 7,520,035 B2 | 4/2009 | Ichida et al. | |
| 7,716,795 B2 | 5/2010 | Versellie et al. | |
| 8,037,581 B2 * | 10/2011 | Gray | A44B 11/2561 24/163 R |
| D667,339 S * | 9/2012 | Bailey | D11/201 |
| 8,418,324 B2 | 4/2013 | Ito | |
| 8,661,625 B2 | 3/2014 | Carene et al. | |
| 8,944,468 B2 | 2/2015 | Cox et al. | |
| 9,090,225 B2 | 7/2015 | Rouhana | |
| 2003/0234530 A1 * | 12/2003 | Moskalik | A44B 11/2561 280/801.1 |
| 2006/0090312 A1 | 5/2006 | Ichida et al. | |
| 2006/0097503 A1 | 5/2006 | Kiyomizu et al. | |
| 2007/0039144 A1 * | 2/2007 | Ichida | A44B 11/2561 24/633 |
| 2009/0295138 A1 * | 12/2009 | Cox | A44B 11/2546 280/801.1 |
| 2012/0240358 A1 * | 9/2012 | Cox | A44B 11/2561 24/164 |
| 2012/0246894 A1 * | 10/2012 | Carene | A44B 11/2561 24/604 |
| 2014/0230195 A1 | 8/2014 | Ruge et al. | |
| 2016/0000190 A1 | 1/2016 | Knoedl | |

FOREIGN PATENT DOCUMENTS

| | | |
|---|---|---|
| EP | 2952395 A1 | 12/2015 |
| FR | 2950301 A1 | 3/2011 |
| GB | 966895 | 8/1964 |
| GB | 1459965 | 12/1976 |
| JP | 2007229350 A | 9/2007 |
| JP | 2009113532 A | 5/2009 |
| KR | 20120079883 A | 7/2012 |
| KR | 20130023847 A | 3/2013 |
| KR | 20130038538 A | 4/2013 |
| KR | 20140060189 A | 5/2014 |
| WO | 8303767 A1 | 11/1983 |
| WO | 2012105762 A2 | 8/2012 |
| WO | 2015172879 A1 | 11/2015 |
| WO | 2016087019 A1 | 6/2016 |

\* cited by examiner

NOISE DAMPENING TONGUES FOR USE IN A SEAT BELT RESTRAINING SYSTEM AND METHODS OF MAKING THE SAME

FIELD

The present disclosure generally relates to a tongue assembly used in a seat belt system capable of restraining the movement of a passenger in a motor vehicle. More specifically, this disclosure relates to a tongue assembly that can be used in a seat belt restraining system that has an anti-rattle or noise dampening construction, as well as a method for forming the same.

BACKGROUND

The statements in this section merely provide background information related to the present disclosure and may not constitute prior art.

Motor vehicles use a seat belt system to protect the passengers of the vehicle. A seat belt system generally includes a belt webbing, a tongue plate and a buckle such that the passengers can be restrained by drawing the belt webbing across the passenger's lap/chest and latching the tongue plate and buckle together. When there is not a passenger in a seat, the belt webbing with the tongue plate suspended therefrom lays idle alongside the vehicle's internal trim panels, such as the A, B, or C pillar trim panels.

Under certain conditions, such as operating the vehicle with the windows down, at higher speeds, or on uneven or rough roads, the movement of the vehicle may cause the tongue plate to shake or vibrate and make contact with the interior trim panel. The tongue plate may also make contact with the interior trim when the passenger of the vehicle unlatches the seat belt in order to exit the vehicle. The occurrence of any contact between the tongue plate and the trim panel can create an undesirable sound or rattle, as well as cause small scratches or dents in the trim panel.

SUMMARY

The present disclosure generally provides a seat belt tongue assembly that exhibits enhanced sound reduction. According to one aspect of the present disclosure, an anti-rattle or noise dampening tongue assembly is provided that includes two different polymeric materials that are operably connected to the body of a base plate. One of these polymeric materials is softer than the other polymeric material in order to minimize the generation of noise when the tongue assembly makes contact with or engages the interior components of the vehicle.

According to one aspect of the present disclosure, a noise dampening tongue assembly is provided for use as part of a seat belt restraining system that uses a belt webbing to restrain the movement of a passenger in a vehicle. This tongue assembly generally comprises a base plate, a cover material and a soft touch material. The base plate has a surface with a lower portion for engagement with a clamping member in the seat belt restraining system and an upper portion with a slot through which the belt webbing extends. The lower portion defines a bottom perimeter for the tongue assembly. The cover material makes contact with the surface of the base plate, such that the cover material defines at least a portion of a top perimeter, a front-side, and a back-side of the tongue assembly (e.g., upper portion of the base plate). The soft touch material makes contact with a surface of the cover material, such that the soft touch material defines at least a portion of a right perimeter and a left perimeter of the tongue assembly and extends horizontally across the surface of the cover material to connect the soft touch material located at the right and left perimeters. Alternatively, the soft touch material may define a substantial portion of the right and left perimeters of the tongue assembly.

When desirable, the surface of the cover material may include a trough that extends horizontally across the surface of the cover material in which the soft touch material may reside. The soft material in the trough may have a thickness, such that at least a portion of an outer surface of the soft material is flush with the surface of the cover material or extends above the trough. In addition, the cover material at one or more of the right and left perimeters of the tongue assembly may comprise at least one edge indentation that is filled with the soft touch material, Finally, the cover material at one or more of the right and left perimeters of the tongue assembly may include at least one dimple that remains at least partially void of the soft touch material or that becomes completely filled with the soft touch material.

According to another aspect of the present disclosure, a method of manufacturing the noise dampening tongue assembly described above and further defined herein is provided. This method generally comprises providing the base plate; placing the cover material in contact with the surface of the base plate; and placing the soft touch material in contact with a surface of the cover material. The base plate may be formed by at least one stamping process, pressing process, or punching process. The cover material may be placed in contact with the surface of the base plate through the use of a molding process, such as a compression molding process or injection molding process. The soft touch material is also placed in contact with the surface of the cover material using a similar molding process in a single operation or multiple operations.

When desirable, the method may further comprise forming a trough in the cover material that extends horizontally across the surface of the cover material, thereby, connecting the right and left perimeters. This trough may be used as a runner system and allow for a single gate in a mold to feed the soft touch material to both the right and left perimeters of the cover material.

According to yet another aspect of the present disclosure, the noise dampening tongue assembly defined herein or manufactured according to the method described herein may be used as part of a seat belt restraining system that incorporates a belt webbing to restrain the movement of an occupant in a vehicle.

Further areas of applicability will become apparent from the description provided herein. One skilled in the art will understand that the description and specific examples presented herein are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
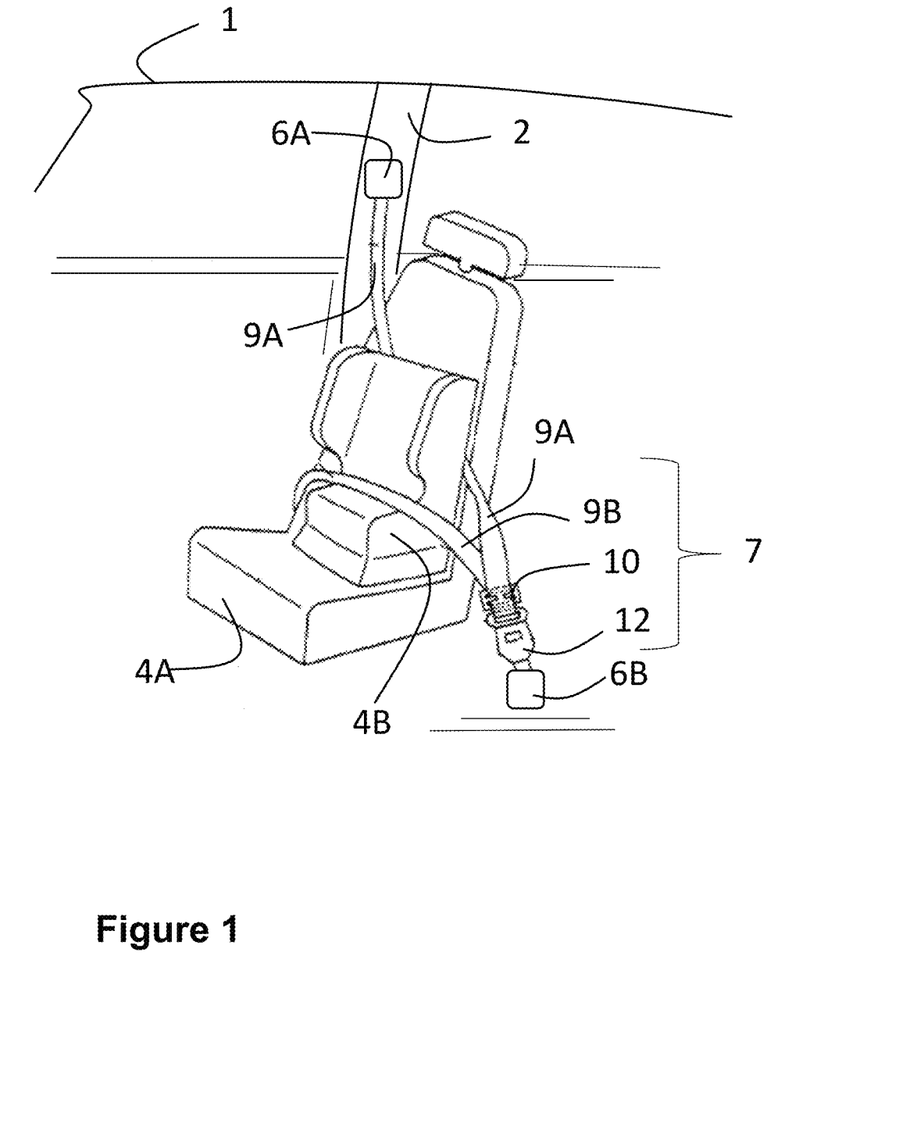
FIG. 1 is a schematic representation of a seat belt apparatus in a motor vehicle.
Figure 2A:
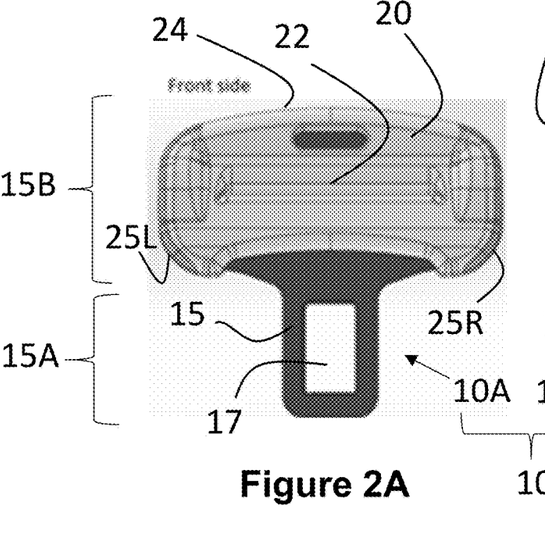
FIG. 2A is a perspective view of the front side of a noise dampening tongue assembly formed according to the teachings of the present disclosure.
Figure 2B:
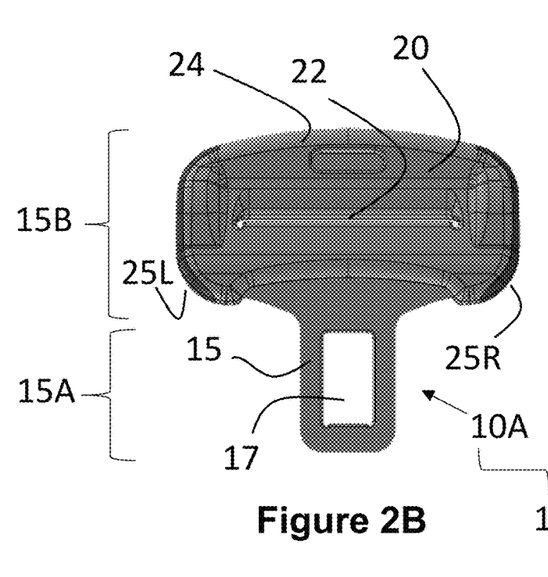
FIG. 2B is a perspective view of the front side of another noise dampening tongue assembly formed according to the teachings of the present disclosure.
Figure 2C:
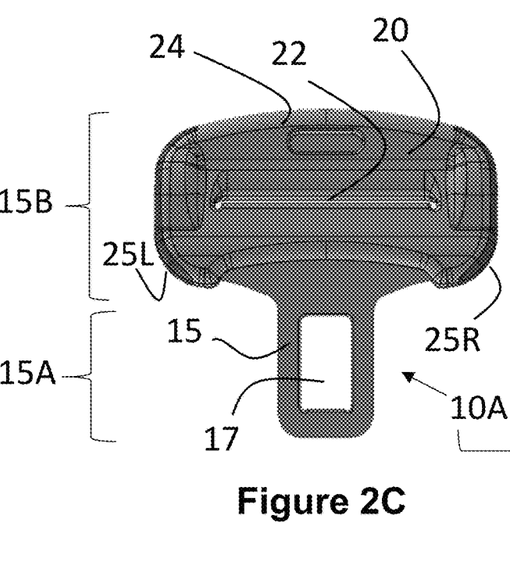
FIG. 2C is a perspective view of the front side of yet another noise dampening tongue assembly formed according to the teachings of the present disclosure.
Figure 3A:
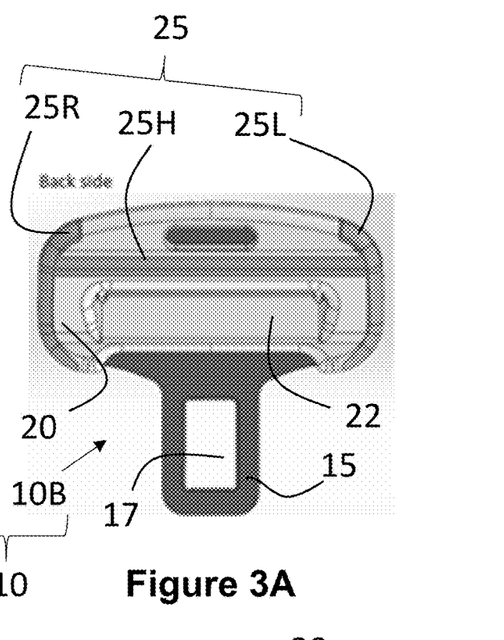
FIG. 3A is a perspective view of the back side of the noise dampening tongue assembly of FIG. 2A.
Figure 3B:
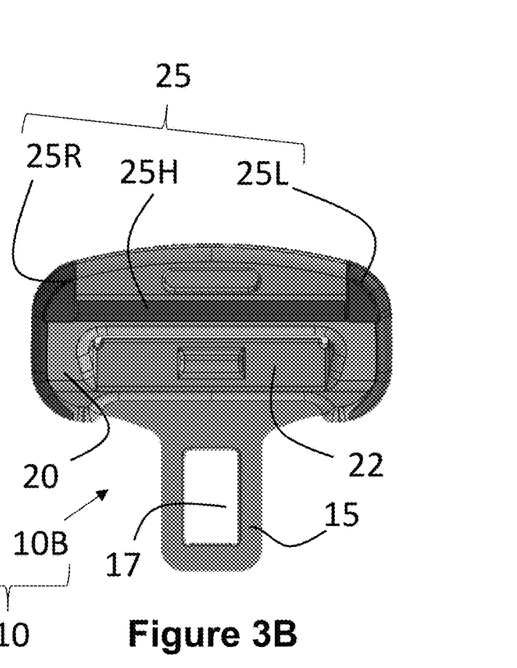
FIG. 3B is a perspective view of the back side of the noise dampening tongue assembly of FIG. 2B.
Figure 3C:
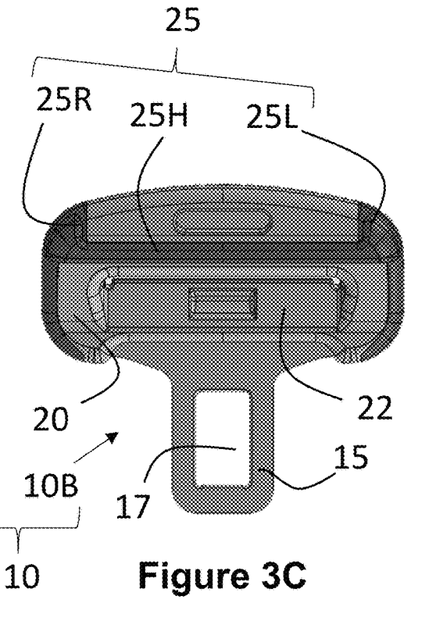
FIG. 3C is a perspective view of the back side of the noise dampening tongue assembly of FIG. 2C.

The present disclosure relates generally to a tongue assembly for use in a motor vehicle seat belt system that is capable of restraining the movement of a passenger of the vehicle. During the operation of a motor vehicle 1, a passenger of the vehicle will sit in a seat 4A or child seat 4B and be restrained by a length of belt webbing 9A, 9B that is anchored to the vehicle body 2 as shown in FIG. 1. More specifically, one section of the belt webbing 9A is secured to an anchor point 6A. The opposite end of the belt webbing 9B is attached to a retractor (not shown), which is also secured to the vehicle body. Intermediate to the ends of the belt webbing 9A, 9B, the webbing passes through a tongue assembly 10 that is part of a seatbelt restraining system 7. When the seat belt restraining system 7 is in use, the tongue assembly 10 latches with a seat buckle 12 that is also secured on its opposite end to the body of the vehicle at point 6B.

When the seat belt restraining system 7 is not in use, the belt webbing 9B is wound on the retractor with a portion of the belt webbing 9A becoming vertically oriented on one side of the seat 4A with the tongue assembly 10 hanging therefrom.

The following description is merely exemplary in nature and is in no way intended to limit the present disclosure or its application or uses. For example, the tongue assembly made and used according to the teachings contained herein is described throughout the present disclosure in conjunction with a seat belt restraining system in a motor vehicle (e.g., automobile) in order to more fully illustrate the composition and the use thereof. The incorporation and use of such a tongue assembly in other vehicles, including off-road vehicles, trucks, boats, helicopters, and other aircraft or the like are contemplated to be within the scope of the present disclosure. One skilled in the art will understand that throughout the description, corresponding reference numerals indicate like or corresponding parts and features.

Still referring to FIG. 1, when the seat 4A is unoccupied and the seat belt system 7 is not in use, the tongue assembly 10 may interact with the interior trim 2 of the vehicle 1 under certain conditions. These conditions may include without limitation the movement of the belt webbing 9A caused by wind or air movement that arises from an open window, the physical movement of a seat 4A, or operation of the vehicle under rough road conditions. The interaction between the interior trim 2 and the tongue assembly 10 may generate a rattle or unwanted noise, as well as result in dents or scratches being formed in the interior trim. The anti-rattle or noise dampening tongue assembly of the present disclosure reduces or eliminates the sounds arising from such interaction between the tongue and the interior trim. The noise dampening tongue also reduces the magnitude and degree of any scratches or dents that may result in the interior trim.

Referring now to FIGS. 2A-2C, 3A-3C, 4A-4C, and 5A-5C, the noise dampening tongue assembly 10 generally comprises, consists of, or consists generally of a base plate 15, a cover material 20, and a soft touch material 25. The base plate 15 has a surface with a lower portion 15A for engagement with a clamping member in the seat belt apparatus and an upper portion 15B with a slot 22 through which the belt webbing extends. The lower portion 15A of the base plate 15 defines the bottom perimeter of the tongue assembly 10. The cover material 20 is in contact with the surface of the base plate 15, such that the cover material 20 defines at least a portion of the front-side 10A and back-side 10B, as well as the top perimeter 24 of the upper portion of the base plate 15 in the tongue assembly 10. The soft touch material 25 is in contact with the surface of the cover material 20, such that the soft touch material 25 defines at least a portion of a right 25R and left perimeter 25L of the tongue assembly 10 When desirable the soft touch material 25 may define a substantial portion of the right and left perimeters of the tongue assembly 10.

Figures 4A, 5A:
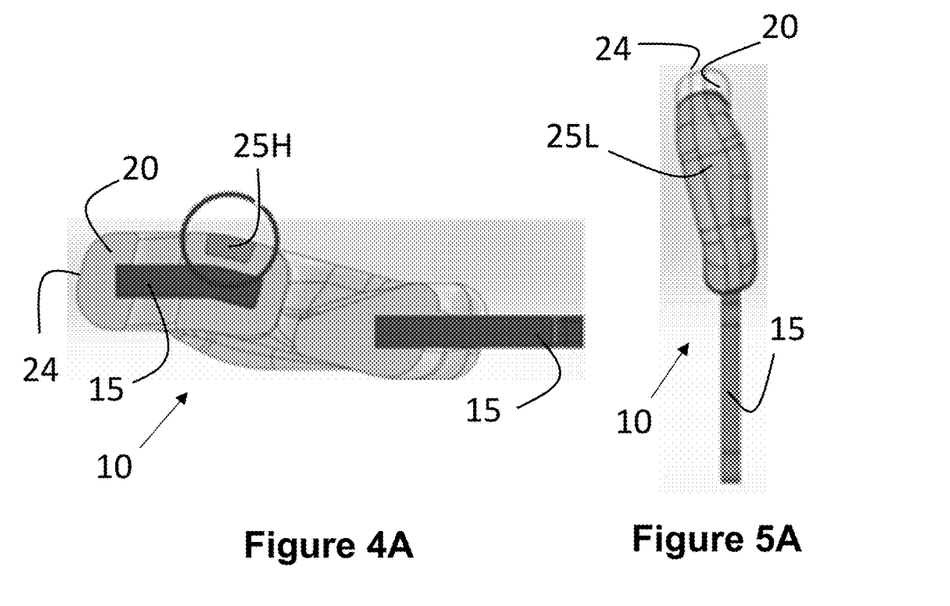
FIG. 4A is a cross-sectional view of the noise dampening tongue assembly of FIGS. 2A and 3A.
FIG. 5A is a perspective side-view of the noise dampening tongue assembly of FIGS. 2A and 3A.
Figures 4B, 5B:
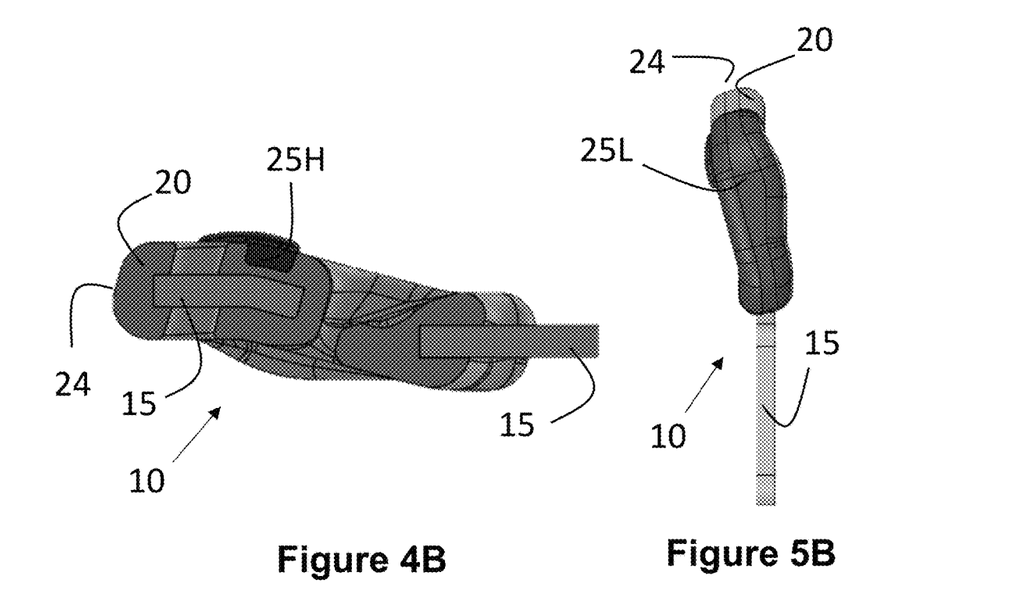
FIG. 4B is a cross-sectional view of the noise dampening tongue assembly of FIGS. 2B and 3B.
FIG. 5B is a perspective side-view of the noise dampening tongue assembly of FIGS. 2B and 3B.
Figures 4C, 5C:
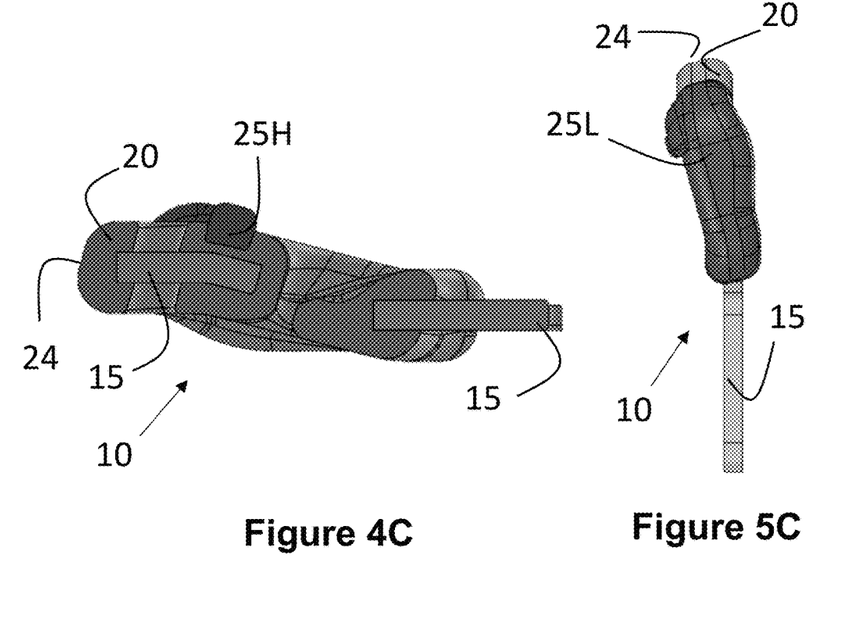
FIG. 4C is a cross-sectional view of the noise dampening tongue assembly of FIGS. 2C and 3C.
FIG. 5C is a perspective side-view of the noise dampening tongue assembly of FIGS. 2C and 3C.

The soft touch material 25 also extends horizontally across the surface of the cover material 20 to connect the soft touch material 25 that is present at the right and left perimeters 25R, 25L of the tongue assembly 10. The surface of the cover material may include a trough in which the soft touch material that extends horizontally across the surface of the cover material resides 25H. The soft touch material in the trough 25H may have a thickness such that at least a portion of the outer surface of the soft touch material 25H fills the trough and is approximately flush with the surface of the cover material 20 as shown in FIGS. 4A and 5A or extends above the trough as shown in FIGS. 4B, 4C, 5B, and 5C.

Still referring to FIGS. 2A-2C, 3A-3C, 4A-4C, and 5A-5C, the body of the base plate 20 may comprise a metal, a metal alloy, or another high strength material formed as a single or solid piece. The upper portion 15B of the base plate 15 is generally wider than the lower portion 15A of the base plate 15. The upper portion 15B includes a slot 22 for receiving the belt webbing of the seat belt restraining system. The lower portion 15A includes an opening 17 that is used to latch or reversibly couple with the buckle in the seat belt restraining system. The opening 17 formed in the lower portion 15A may exhibit a variety of different geometric designs, including but not limited to a circle, an ellipse, a triangle, a square, and a rectangle.

The metal or metal alloy may include, but not be limited to a AISI 4130 alloy steel that incorporates one or more strengthening agents, such as chromium or molybdenum, to name a few. The base plate may be flat or bent one or more times in the upper portion 15B or in transitioning between the lower portion 15A and upper portion 15B as best shown by FIGS. 4A-4C and 5A-5C. The base plate 15 may be heat treated to harden the metal or metal alloy. When desirable, the base plate 15 may be plated (e.g., chrome plating, etc.) to further enhance properties, including without limitation, aesthetic qualities, the strength, or corrosion resistance of the base plate 15. The upper portion 15B of the base plate 15 represents the portion of the tongue assembly 10 that a passenger may grip in order to latch the lower portion 15A of the base plate 15 to a buckle or unlatch the tongue assembly 10 therefrom.

Still referring to FIGS. 2A-2C, 3A-3C, 4A-4C, and 5A-5C, the cover material comprises a hard plastic material having a hardness between about 50 to about 150 Rockwell R hardness as measured in a ball indentation hardness test, such as ISO 2039-1 or DIN 53456. Alternatively, the hardness of the cover material is in the range of 70 to 130 Rockwell R; alternatively, in the range of about 100 to 120 Rockwell R.

The cover material 20 may comprise a moldable thermoplastic polymer. This thermoplastic polymer may include but not limited to, one or more of a polytetrafluoroethylene, a polyphenylene, a polystyrene, a polyamide, an acrylic, a phenolic, a polyacetal, a polybutadiene, a polyethylene-polybutadiene, a polyetherimide, and a mixture or copolymer thereof. Alternatively, the cover material 20 comprises a polystyrene, a polyamide, a polyacetal, or a mixture or copolymer thereof. Alternatively, the cover material is a polyamide, including without limitation NYLON® 6, NYLON® 11, and NYLON® 12. When desirable the cover material 20 may include one or more additives to enhance manufacturability and/or performance. For example, a colorant may be incorporated into the cover material 20 in order to coordinate the color of the tongue assembly with the interior appearance or finish of the motor vehicle. The additives may include but not be limited to various pigments, colorants, fillers, dispersants or surfactants, coalescent agents, pH neutralizing agents, plasticizers, defoamers, surfactants, thickeners, biocides, rheology modifiers, wetting or spreading agents, leveling agents, conductive additives, adhesion promoters, anti-blocking agents, anti-cratering agents or anti-crawling agents, antifreezing agents, corrosion inhibitors, anti-static agents, flame retardants, optical brighteners, UV absorbers or other light stabilizers, chelating agents, crosslinking agents, flattening agents, flocculants, humectants, insecticides, lubricants, odorants, oils, waxes or anti-slip aids, soil repellants, or stain resistant agents, as well as mixtures and combinations thereof.

In addition to providing a surface that may be easily gripped by a passenger without discomfort when attempting to use the seat belt restraining system in a vehicle, the cover material 20 also protects the belt webbing from excessive wear. The cover material 20 may interact with the belt webbing as the webbing passes through the slot 22 in the base plate 15. The physical dimensions of the slot 22 in the base plate 15 are individually selected in relation to the width and thickness of the belt webbing that is used in the seat belt restraining system.

The belt webbing is easily threaded into and pulled out of the slot through the base plate and the cover material. The webbing may include a plastic coating that is capable of protecting the webbing from excessive wear as it goes through the slot.

The soft touch material 25 can be any elastomeric or rubber material that has a hardness between about 20 to about 95 durometer on the Shore A scale as measured via a durometer hardness test, such as ASTM D2244, ISO 7619, ISO 868, DIN 53505, or JIS K6301. Alternatively, the hardness of the soft touch material 25 is in the range of 35 to 80 durometer Shore A; alternatively, in the range of about 40 to 65 durometer Shore A.

The soft touch material 25 may comprise any moldable thermoplastic or thermoset polymers, including but not limited to, one or more of a silicone, a natural butyl rubber (NBR), a polychoroprene rubber, a styrene-butadiene rubber (SBR), an ethylene propylene diene monomer (EPDM) rubber, a chlorosulfonated polyethylene (CSPE), a polypropylene, and a mixture or copolymer thereof; Alternatively, the soft touch material comprises one or more thermoplastic elastomers (TPE), including without limitation a block copolymer of polystyrene and a rubber, such as polyethylene-butylene or polybutadiene. The soft touch material may be individually selected to be any thermoplastic elastomer that exhibits a hardness within the defined range and adheres to the cover material.

The thickness of the over-molded soft touch material 25 is selected based on the desired application to be sufficiently thick (about 3.2 mm or ⅛ inch or more) in order to reduce any contact noise generated by the tongue assembly 10 as it contacts the interior trim 2 of the vehicle. The over-molded soft touch material 25 does not form a relatively soft plastic surround around all of the edges or perimeter of the cover material 20. Rather the soft touch material 25 is formed only partially thereon.

Figure 6A:
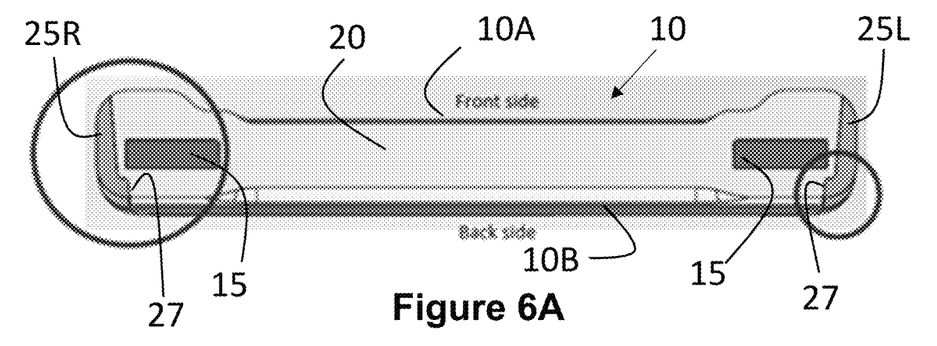
FIG. 6A is a perspective top-down view of another noise dampening tongue assembly formed according to the teachings of the present disclosure.
Figure 6B:
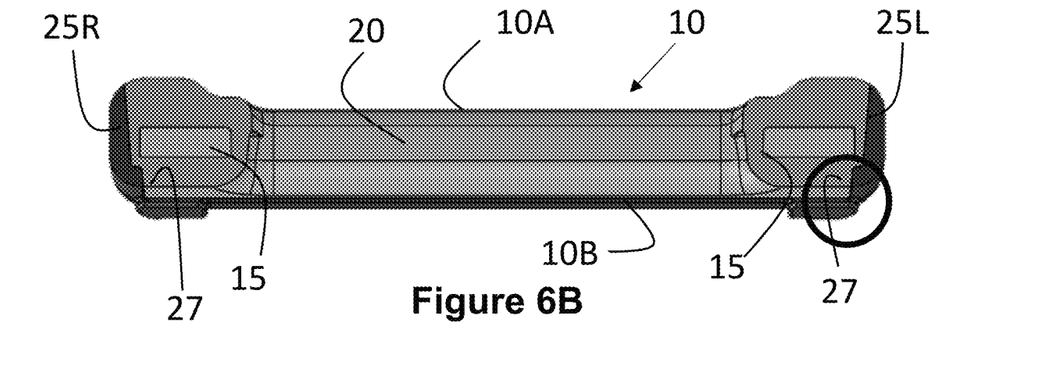
FIG. 6B is a perspective top-down view of yet another noise dampening tongue assembly formed according to the teachings of the present disclosure.
Figure 6C:
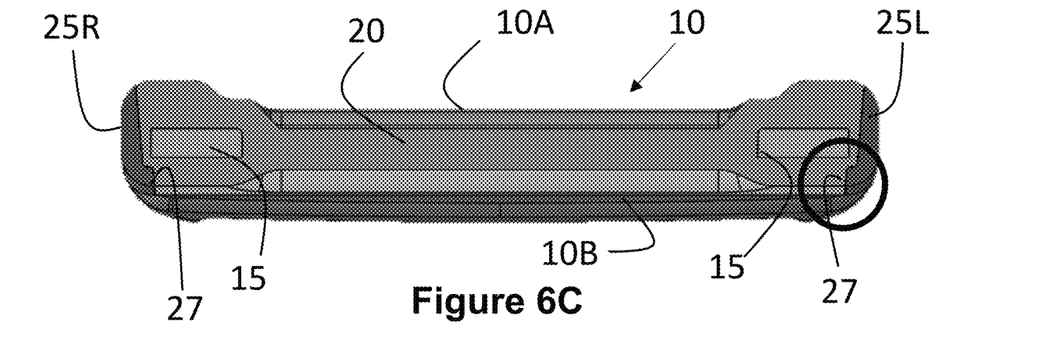
FIG. 6C is a perspective top-down view of still another noise dampening tongue assembly formed according to the teachings of the present disclosure.

Referring now to FIGS. 6A-6C, one or more of the right and left perimeters of the cover material 20 comprises at least one edge indentation 27. Alternatively, each of the right and left perimeters of the cover material 20 include one or more edge indentations. The edge indentations may be approximate to the front-side 10A or the back-side 10B of the tongue assembly 10. Alternatively, the indentation is approximate to the back-side 10B of the tongue assembly 10. The soft touch material 25R, 25L that is located on the right and left perimeters may fill the edge indentation. The increased surface area generated by the edge indentation 27 along as the inherent step created in the cover material 20 assists in adhering the soft-touch material 25 to the cover material 20 during the use of the tongue assembly 10.

Figure 7A:
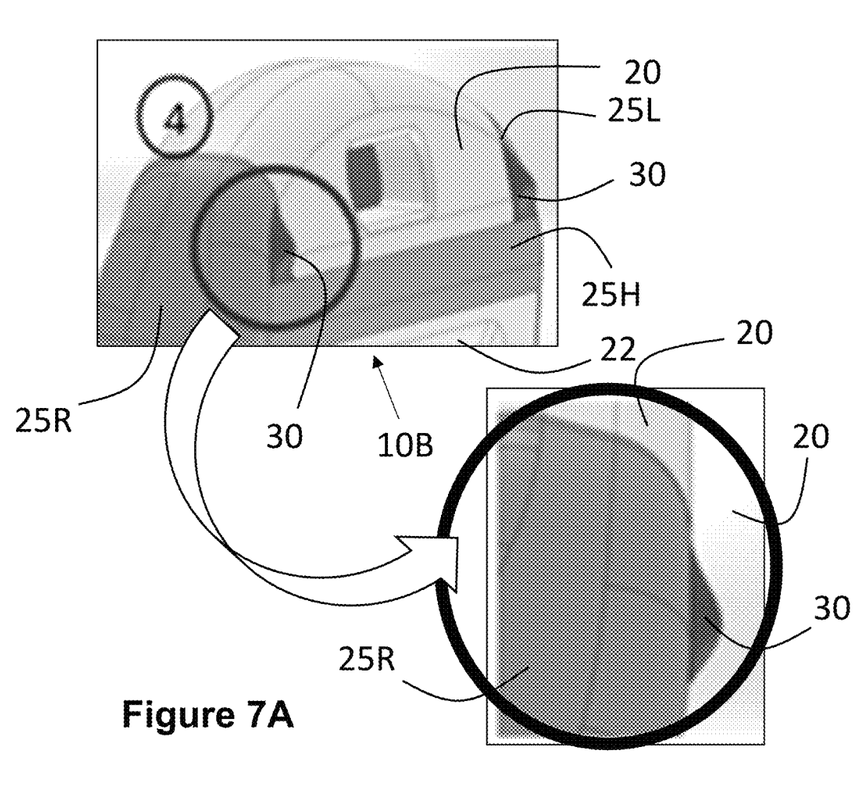
FIG. 7A is a perspective view of a portion of another noise dampening tongue assembly formed according to the teachings of the present disclosure.
Figure 7B:
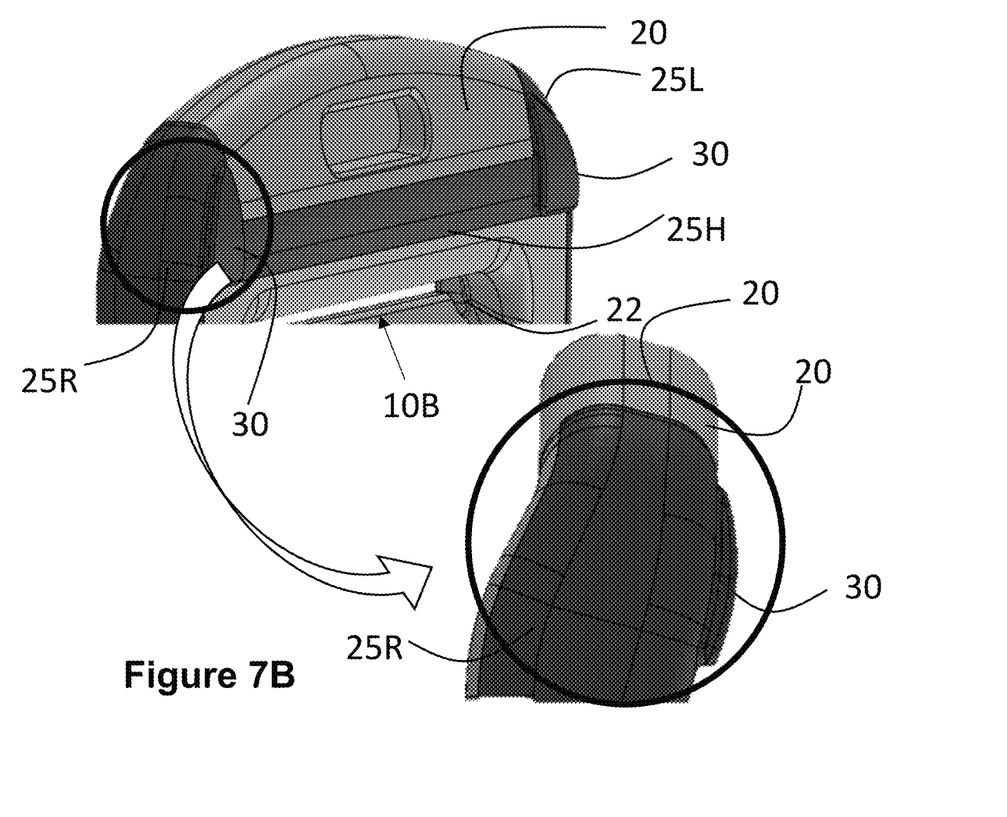
FIG. 7B is a perspective view of a portion of yet another noise dampening tongue assembly formed according to the teachings of the present disclosure.
Figure 7C:
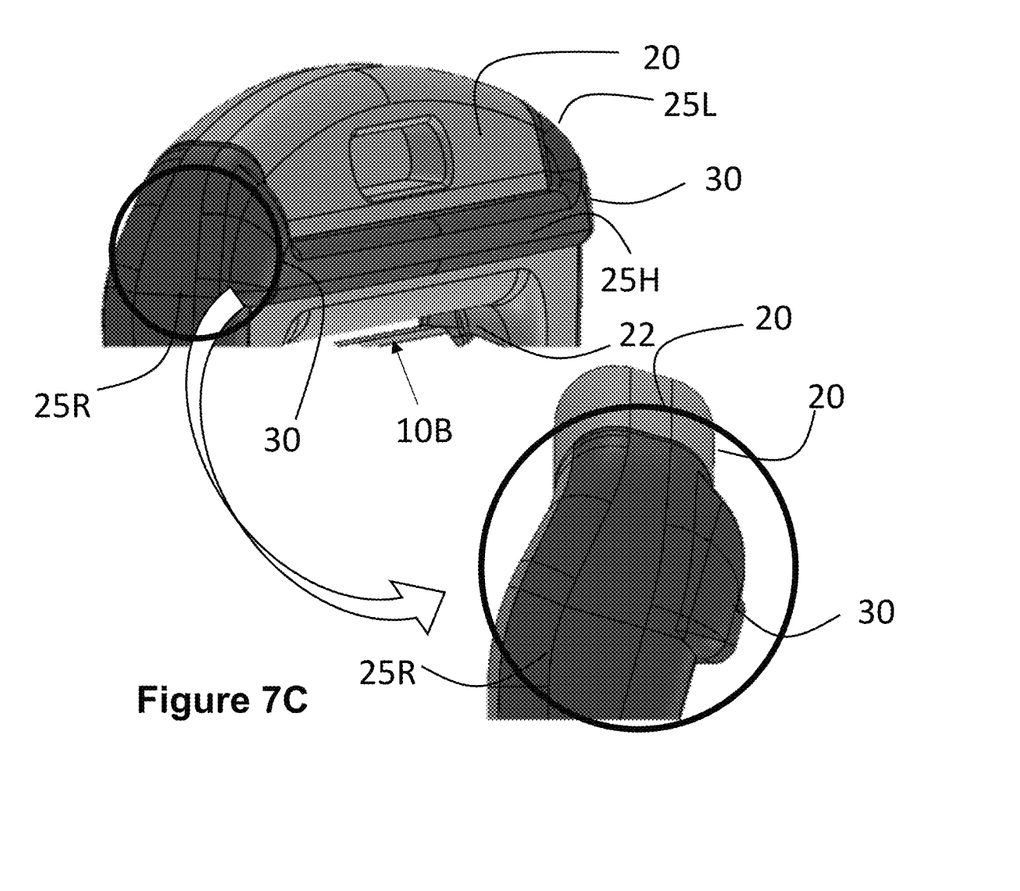
FIG. 7C is a perspective view of a portion of still another noise dampening tongue assembly formed according to the teachings of the present disclosure.

Referring now to FIGS. 7A-7C, one or more of the right and left perimeters of the cover material may comprise at least one dimple 30. Alternatively, at least one dimple 30 is located on both the right and left perimeters of the cover material 20. This dimple 30 may remain at least partially void of the soft touch material 25R, 25L, 25H located adjacent to the dimple 30 as shown in FIG. 7A. Alternatively, the soft touch material 25R, 25L, 25H may at least partially fill the dimple 30; alternatively, completely fill the dimple as shown in FIGS. 7B and 7C.

Figure 8:
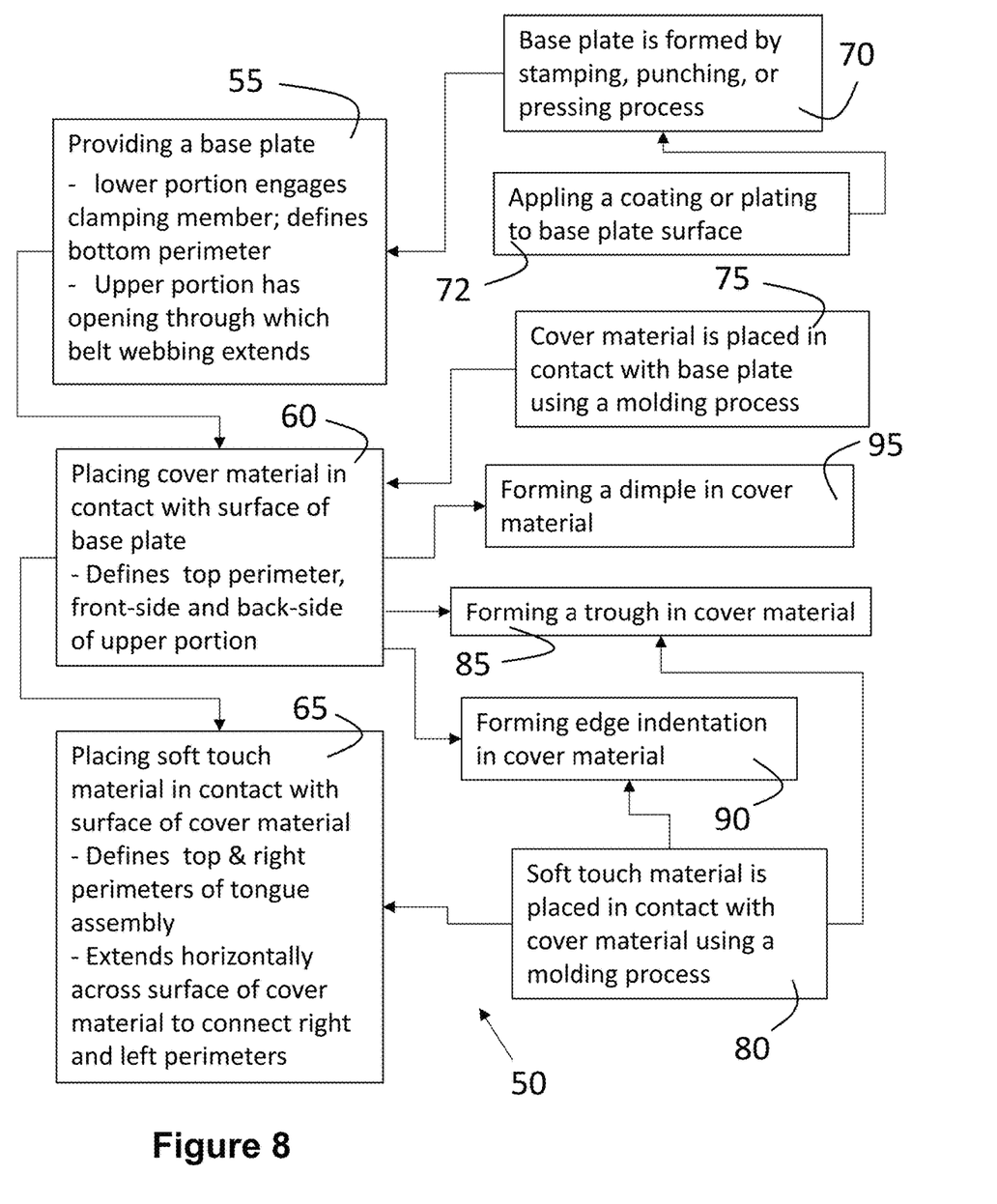
FIG. 8 is a flow chart of a method for manufacturing a noise dampening tongue assembly according to the teachings of the present disclosure.

According to another aspect of the present disclosure, a method is provided for manufacturing the noise dampening tongue assembly for use as part of a seat belt restraining system that incorporates a belt webbing to restrain the movement of a passenger in a vehicle. Referring now to FIG. 8, this method 50 generally comprises, consists of, or consists essentially of providing 55 a base plate, placing 60 a cover material in contact with the surface of the base plate; and placing 65 a soft touch material in contact with the surface of the cover material.

The base plate may be formed using at least one stamping process, pressing process, or punching process 70. When desirable, the method may further comprise applying 72 a coating or plating to the surface of the base plate.

The cover material is placed in contact with the surface of the base plate using a molding process 75, including without limitation, a compression molding process or an injection molding process. The soft touch material also may be placed in contact with the surface of the cover material using a similar molding process 80 to over-mold the soft touch material onto the cover material. The over-molding of the soft touch material onto the cover material may be done immediately after the application of cover material, e.g., while the cover material is still warm and has not been allowed to cool down to ambient temperature, e.g., 25° C. The over-molding of the soft touch material onto the cover material may also be done after the cover material has cooled to ambient temperature. Thus, the over-molding of the soft touch material onto the cover material may be done as a single operation or in multiple operations.

Still referring to FIG. 8, the process 50 may further comprise forming 85 a trough in the cover material prior to the application of the soft touch material. This trough may be used as part of the runner system during the molding operation. This trough allows for a single gate in a mold to feed the soft touch material to both the right and left perimeters of the cover material.

When desirable, one or more edge indentations may be formed 90 in the cover material. The edge indention may subsequently be filled by the soft-touch material. In addition, a dimple may be formed 95 in the cover material. Although the soft touch material may cover the dimple on the right and left perimeters, the dimple remains at least partially void of the soft touch material. Alternatively, the dimple remains substantially void of the soft touch material.

For the purpose of this disclosure the terms "about" and "substantially" are used herein with respect to measurable values and ranges due to expected variations known to those skilled in the art (e.g., limitations and variability in measurements).

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polyurethane is interpreted to include one or more polymer molecules of the polyurethane, where the polymer molecules may or may not be identical (e.g., different molecular weights).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one polyurethane", "one or more polyurethanes", and "polyurethane(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A noise dampening tongue assembly for use as part of a seat belt restraining system that uses a belt webbing to restrain the movement of a passenger in a vehicle, the tongue assembly comprising:
   a base plate having a surface with a lower portion for engagement with a clamping member in the seat belt restraining system and an upper portion with a slot through which the belt webbing extends; wherein the lower portion defines a bottom perimeter for the tongue assembly;
   a cover material in contact with the surface of the base plate, such that the cover material defines at least a portion of a top perimeter, a front-side, and a back-side of the tongue assembly; and
   a soft touch material over-molded onto an external surface of the cover material, such that the soft touch material defines at least a portion of a right perimeter and a left perimeter of the tongue assembly and extends horizontally across the surface of the cover material to connect the soft touch material located at the right and left perimeters;
   wherein the soft touch material and the cover material exhibit different hardnesses, such that the hardness of the cover material is greater than the hardness of the soft touch material.

2. The tongue assembly according to claim 1, wherein the tongue assembly comprises a thermoplastic composite (TPC); wherein cover material has a hardness in the range of about 50 to about 150 on the Rockwell R scale and the soft touch material has a hardness in the range of about 20 to about 95 durometer on the Shore A scale.

3. The tongue assembly according to claim 1, wherein the surface of the cover material includes a trough that contains the soft touch material that extends horizontally across the surface of the cover material.

4. The tongue assembly according to claim 3, wherein the soft touch material in the trough has a thickness that allows at least a portion of an outer surface of the soft touch material to be flush with the surface of the cover material or to extend above the trough.

5. The tongue assembly according to claim 1, wherein the cover material at one or more of the right and left perimeters comprises at least one edge indentation that is filled by the soft touch material.

6. The tongue assembly according to claim 1, wherein the cover material at one or more of the right and left perimeters comprises at least one dimple that is at least partially void of the soft touch material or is completely filled with the soft touch material.

7. The tongue assembly according to claim 1, wherein the soft touch material defines a substantial portion of the right and left perimeters of the tongue assembly.

8. The tongue assembly of claim 1, wherein the cover material comprises one or more of a polytetrafluoroethylene, a polyphenylene, a polystyrene, a polyamide, an acrylic, a phenolic, a polyacetal, a polybutadiene, a polyethylene-polybutadiene, a polyetherimide, and a mixture or copolymer thereof.

9. The tongue assembly of claim 1, wherein the soft touch material comprises one or more of a silicone, a natural butyl rubber (NBR), a polychoroprene rubber, a styrene-butadiene rubber (SBR), an ethylene propylene diene monomer (EPDM) rubber, a chlorosulfonated polyethylene (CSPE), a polypropylene, and a mixture or copolymer thereof.

10. The tongue assembly according to claim 1, wherein the cover material comprises a polyamide and the soft touch material comprises a thermoplastic elastomer (TPE).

11. The use of the noise dampening tongue assembly according claim 1 as part of a seat belt restraining system that incorporates a belt webbing to restrain the movement of a passenger in a vehicle.

12. A method of manufacturing a noise dampening tongue assembly for use as part of a seat belt restraining system that incorporates a belt webbing to restrain the movement of a passenger in a vehicle, the method comprising:
providing a base plate having a surface with a lower portion for engagement with a clamping member in the seat belt restraining system and an upper portion with a slot through which the belt webbing extends; wherein the lower portion defines a bottom perimeter for the tongue assembly;
placing a cover material in contact with the surface of the base plate, such that the cover material defines at least a portion of a top perimeter, a front-side, and a back-side of the upper portion of the tongue assembly; and
over-molding a soft touch material onto an external surface of the cover material such that the soft touch material defines at least a portion of a right perimeter and a left perimeter of the tongue assembly and extends horizontally across the surface of the cover material to connect the soft touch material located at the right and left perimeters;
wherein the soft touch material and the cover material exhibit different hardnesses, such that the hardness of the cover material is greater than the hardness of the soft touch material.

13. The method according to claim 12, wherein the base plate is formed by at least one stamping process, pressing process, or punching process and the cover material is placed in contact with the surface of the base plate through the use of a compression molding process or an injection molding process.

14. The method according to claim 12, wherein the soft touch material is placed in contact with the surface of the cover material through the use of a molding process.

15. The method according to claim 14, wherein the method further comprises forming a trough in the cover material that extends horizontally across the surface of the cover material and connects the right and left perimeters.

16. The method according to claim 15, wherein the trough is used as a runner system and allows for a single gate in a mold to feed the soft touch material to both the right and left perimeters of the tongue assembly.

17. The method according to claim 12, wherein the method further comprises forming at least one edge indentation in the cover material at one or more of the right and left perimeters of the tongue assembly, wherein the edge indentation is subsequently filled with the soft touch material.

18. The method according to claim 12, wherein the method further comprises forming at least one dimple in the cover material on one or more of the right and left perimeters of the tongue assembly;
wherein the at least one dimple subsequently remains at least partially void of the soft touch material or is completely filled with the soft touch material.

19. The method according to claim 12, wherein the soft touch material defines a substantial portion of the right and left perimeters of the tongue assembly.

20. The method according to claim 12, wherein the cover material comprises one or more of a polytetrafluoroethylene, a polyphenylene, a polystyrene, a polyamide, an acrylic, a phenolic, a polyacetal, a polybutadiene, a polyethylene-polybutadiene, a polyetherimide, and a mixture or copolymer thereof;
wherein the soft touch material comprises a silicone, a natural butyl rubber (NBR), a polychoroprene rubber, a styrene-butadiene rubber (SBR), an ethylene propylene diene monomer (EPDM) rubber, a chlorosulfonated polyethylene (CSPE), a polypropylene, and a mixture or copolymer thereof.

21. The use of a noise dampening tongue assembly as part of a seat belt restraining system that incorporates a belt webbing to restrain the movement of a passenger in a vehicle; the noise dampening tongue assembly being formed according to claim 12.

* * * * *